United States Patent
Sanchez

(10) Patent No.: US 9,514,418 B2
(45) Date of Patent: Dec. 6, 2016

(54) METHOD FOR REFINING COGNITIVE INSIGHTS USING COGNITIVE GRAPH VECTORS

(71) Applicant: Cognitive Scale, Inc., Austin, TX (US)

(72) Inventor: Matthew Sanchez, Austin, TX (US)

(73) Assignee: COGNITIVE SCALE, INC., Austin, TX (US)

( * ) Notice: Subject to any disclaimer, the term of this patent is extended or adjusted under 35 U.S.C. 154(b) by 0 days.

(21) Appl. No.: 14/629,740

(22) Filed: Feb. 24, 2015

(65) Prior Publication Data

US 2016/0171389 A1 Jun. 16, 2016

Related U.S. Application Data

(60) Provisional application No. 62/091,212, filed on Dec. 12, 2014, provisional application No. 62/009,626, filed on Jun. 9, 2014.

(51) Int. Cl.
*G06N 99/00* (2010.01)
*G06N 5/02* (2006.01)

(52) U.S. Cl.
CPC .............. *G06N 99/005* (2013.01); *G06N 5/02* (2013.01)

(58) Field of Classification Search
None
See application file for complete search history.

(56) References Cited

U.S. PATENT DOCUMENTS

| | | | |
|---|---|---|---|
| 2015/0356168 A1* | 12/2015 | Kothe | G06F 17/30613 707/741 |
| 2015/0356201 A1 | 12/2015 | Kothe et al. | |
| 2015/0356422 A1 | 12/2015 | Sanchez et al. | |

OTHER PUBLICATIONS

Sanchez, M., U.S. Appl. No. 14/629,737, filed Feb. 14, 2015, entitled System For Refining Cognitive Insights Using Cognitive Graph Vectors.

* cited by examiner

*Primary Examiner* — Stanley K Hill
*Assistant Examiner* — Nathan Brown, Jr.
(74) *Attorney, Agent, or Firm* — Terrile, Cannatti, Chambers & Holland, LLP; Stephen A. Terrile

(57) ABSTRACT

A method, system and computer-usable medium for using cognitive graph vectors to refine cognitive insights.

6 Claims, 6 Drawing Sheets

METHOD FOR REFINING COGNITIVE INSIGHTS USING COGNITIVE GRAPH VECTORS

BACKGROUND OF THE INVENTION

Field of the Invention

The present invention relates in general to the field of computers and similar technologies, and in particular to software utilized in this field. Still more particularly, it relates to a method for using cognitive graph vectors.

Description of the Related Art

In general, "big data" refers to a collection of datasets so large and complex that they become difficult to process using typical database management tools and traditional data processing approaches. These datasets can originate from a wide variety of sources, including computer systems, mobile devices, credit card transactions, television broadcasts, and medical equipment, as well as infrastructures associated with cities, sensor-equipped buildings and factories, and transportation systems. Challenges commonly associated with big data, which may be a combination of structured, unstructured, and semi-structured data, include its capture, curation, storage, search, sharing, analysis and visualization. In combination, these challenges make it difficult to efficiently process large quantities of data within tolerable time intervals.

Nonetheless, big data analytics hold the promise of extracting insights by uncovering difficult-to-discover patterns and connections, as well as providing assistance in making complex decisions by analyzing different and potentially conflicting options. As such, individuals and organizations alike can be provided new opportunities to innovate, compete, and capture value.

One aspect of big data is "dark data," which generally refers to data that is either not collected, neglected, or underutilized. Examples of data that is not currently being collected includes location data prior to the emergence of companies such as Foursquare or social data prior to the advent companies such as Facebook. An example of data that is being collected, but is difficult to access at the right time and place, includes data associated with the side effects of certain spider bites while on a camping trip. As another example, data that is collected and available, but has not yet been productized of fully utilized, may include disease insights from population-wide healthcare records and social media feeds. As a result, a case can be made that dark data may in fact be of higher value than big data in general, especially as it can likely provide actionable insights when it is combined with readily-available data.

SUMMARY OF THE INVENTION

A method is disclosed for using cognitive graph vectors to refine cognitive insights.

More specifically, in one embodiment, the invention relates to a method for refining cognitive insights using cognitive graph vectors comprising: storing data from a plurality of data sources within a cognitive graph; associating a first set of the data within the cognitive graph with a first cognitive graph vector of a plurality of cognitive graph vectors; associating a second set of the data within the cognitive graph with a second cognitive graph vector of the plurality of cognitive graph vectors; processing the data from the plurality of data sources to provide cognitive insights; and refining the cognitive insights based upon a limitation relating to one of the plurality of cognitive graph vectors.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
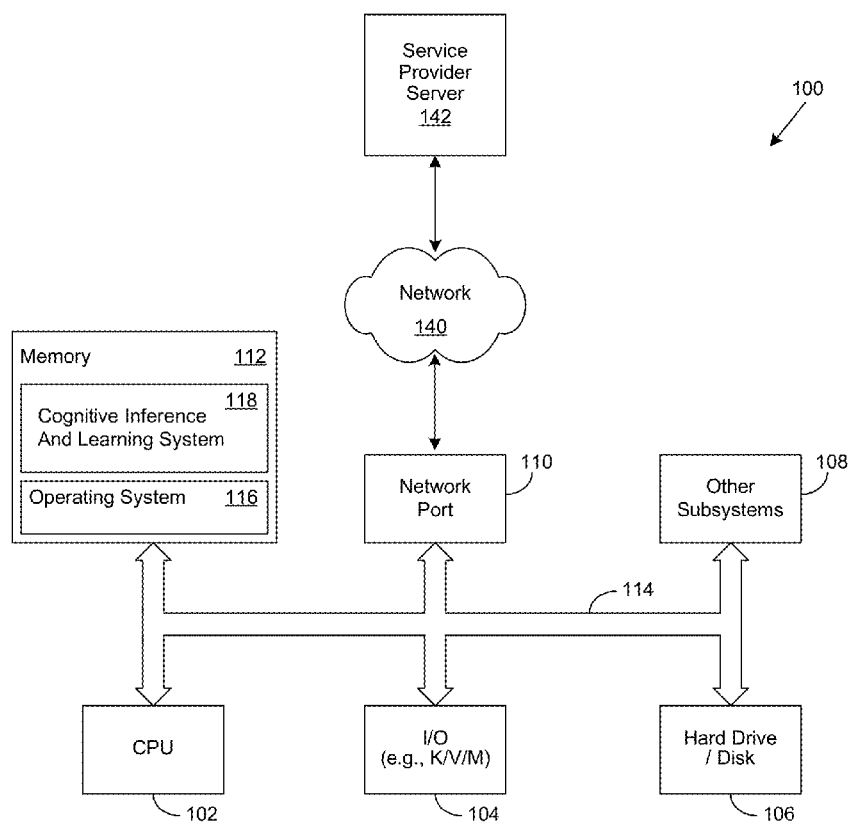
FIG. 1 depicts an exemplary client computer in which the present invention may be implemented.

A method, system and computer-usable medium are disclosed for using cognitive graph vectors to refine cognitive insights. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a generalized illustration of an information processing system 100 that can be used to implement the system and method of the present invention. The information processing system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information processing system 100 also includes network port 110 operable to connect to a network 140, which is likewise accessible by a service provider server 142. The information processing system 100 likewise includes system memory 112, which is interconnected to the foregoing via one or more buses 114. System memory 112 further comprises operating system (OS) 116 and in various embodiments may also comprise cognitive inference and learning system (CILS) 118. In these and other embodiments, the CILS 118 may likewise comprise invention modules 120. In one embodiment, the information processing system 100 is able to download the CILS 118 from the service provider server 142. In another embodiment, the CILS 118 is provided as a service from the service provider server 142.

In various embodiments, the CILS 118 is implemented to perform various cognitive computing operations described in greater detail herein. As used herein, cognitive computing broadly refers to a class of computing involving self-learning systems that use techniques such as spatial navigation, machine vision, and pattern recognition to increasingly mimic the way the human brain works. To be more specific, earlier approaches to computing typically solved problems by executing a set of instructions codified within software. In contrast, cognitive computing approaches are data-driven, sense-making, insight-extracting, problem-solving systems that have more in common with the structure of the human brain than with the architecture of contemporary, instruction-driven computers.

To further differentiate these distinctions, traditional computers must first be programmed by humans to perform specific tasks, while cognitive systems learn from their interactions with data and humans alike, and in a sense, program themselves to perform new tasks. To summarize the difference between the two, traditional computers are designed to calculate rapidly. Cognitive systems are designed to quickly draw inferences from data and gain new knowledge.

Cognitive systems achieve these abilities by combining various aspects of artificial intelligence, natural language processing, dynamic learning, and hypothesis generation to render vast quantities of intelligible data to assist humans in making better decisions. As such, cognitive systems can be characterized as having the ability to interact naturally with people to extend what either humans, or machines, could do on their own. Furthermore, they are typically able to process natural language, multi-structured data, and experience much in the same way as humans. Moreover, they are also typically able to learn a knowledge domain based upon the best available data and get better, and more immersive, over time.

It will be appreciated that more data is currently being produced every day than was recently produced by human beings from the beginning of recorded time. Deep within this ever-growing mass of data is a class of data known as "dark data," which includes neglected information, ambient signals, and insights that can assist organizations and individuals in augmenting their intelligence and deliver actionable insights through the implementation of cognitive applications. As used herein, cognitive applications, or "cognitive apps," broadly refer to cloud-based, big data interpretive applications that learn from user engagement and data interactions. Such cognitive applications extract patterns and insights from dark data sources that are currently almost completely opaque. Examples of such dark data include disease insights from population-wide healthcare records and social media feeds, or new sources of information, such as sensors monitoring pollution in delicate marine environments.

Over time, it is anticipated that cognitive applications will fundamentally change the ways in which many organizations operate as they invert current issues associated with data volume and variety to enable a smart, interactive data supply chain. Ultimately, cognitive applications hold the promise of receiving a user query and immediately providing a data-driven answer from a masked data supply chain in response. As they evolve, it is likewise anticipated that cognitive applications may enable a new class of "sixth sense" applications that intelligently detect and learn from relevant data and events to offer insights, predictions and advice rather than wait for commands. Just as web and mobile applications changed the way people access data, cognitive applications may change the way people listen to, and become empowered by, multi-structured data such as emails, social media feeds, doctors notes, transaction records, and call logs.

However, the evolution of such cognitive applications has associated challenges, such as how to detect events, ideas, images, and other content that may be of interest. For example, assuming that the role and preferences of a given user are known, how is the most relevant information discovered, prioritized, and summarized from large streams of multi-structured data such as news feeds, blogs, social media, structured data, and various knowledge bases? To further the example, what can a healthcare executive be told about their competitor's market share? Other challenges include the creation of a contextually-appropriate visual summary of responses to questions or queries.

Figure 2:
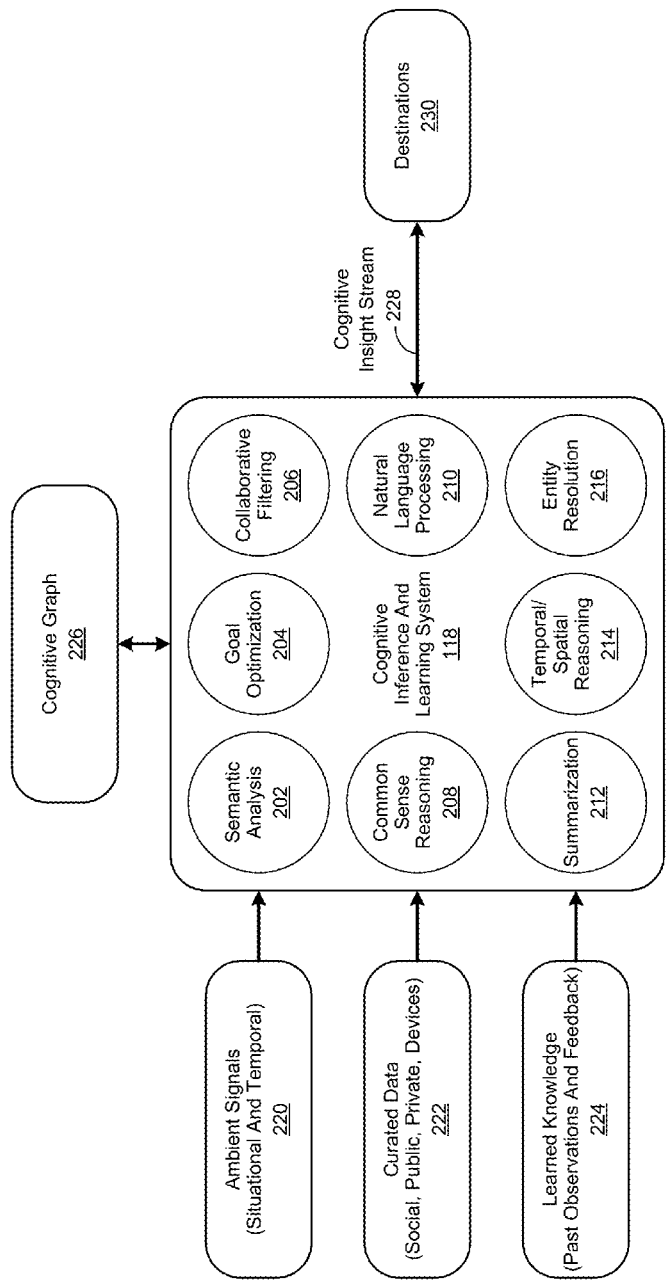
FIG. 2 is a simplified block diagram of a cognitive inference and learning system (CILS)

FIG. 2 is a simplified block diagram of a cognitive inference and learning system (CILS) implemented in accordance with an embodiment of the invention. In various embodiments, the CILS 118 is implemented to incorporate a variety of processes, including semantic analysis 202, goal optimization 204, collaborative filtering 206, common sense reasoning 208, natural language processing 210, summarization 212, temporal/spatial reasoning 214, and entity resolution 216 to generate cognitive insights.

As used herein, semantic analysis 202 broadly refers to performing various analysis operations to achieve a semantic level of understanding about language by relating syntactic structures. In various embodiments, various syntactic structures are related from the levels of phrases, clauses, sentences and paragraphs, to the level of the body of content as a whole and to its language-independent meaning In certain embodiments, the semantic analysis 202 process includes processing a target sentence to parse it into its individual parts of speech, tag sentence elements that are related to predetermined items of interest, identify dependencies between individual words, and perform co-reference resolution. For example, if a sentence states that the author really likes the hamburgers served by a particular restaurant, then the name of the "particular restaurant" is co-referenced to "hamburgers."

As likewise used herein, goal optimization 204 broadly refers to performing multi-criteria decision making operations to achieve a given goal or target objective. In various embodiments, one or more goal optimization 204 processes are implemented by the CILS 118 to define predetermined goals, which in turn contribute to the generation of a cognitive insight. For example, goals for planning a vacation trip may include low cost (e.g., transportation and accommodations), location (e.g., by the beach), and speed (e.g., short travel time). In this example, it will be appreciated that certain goals may be in conflict with another. As a result, a cognitive insight provided by the CILS 118 to a traveler may indicate that hotel accommodations by a beach may cost more than they care to spend.

Collaborative filtering 206, as used herein, broadly refers to the process of filtering for information or patterns through the collaborative involvement of multiple agents, viewpoints, data sources, and so forth. The application of such collaborative filtering 206 processes typically involves very large and different kinds of data sets, including sensing and monitoring data, financial data, and user data of various kinds Collaborative filtering 206 may also refer to the process of making automatic predictions associated with predetermined interests of a user by collecting preferences or other information from many users. For example, if person 'A' has the same opinion as a person 'B' for a given issue 'x', then an assertion can be made that person 'A' is more likely to have the same opinion as person 'B' opinion on a different issue 'y' than to have the same opinion on issue 'y' as a randomly chosen person. In various embodiments, the collaborative filtering 206 process is implemented with various recommendation engines familiar to those of skill in the art to make recommendations.

As used herein, common sense reasoning 208 broadly refers to simulating the human ability to make deductions from common facts they inherently know. Such deductions may be made from inherent knowledge about the physical properties, purpose, intentions and possible behavior of ordinary things, such as people, animals, objects, devices, and so on. In various embodiments, common sense reasoning 208 processes are implemented to assist the CILS 118 in understanding and disambiguating words within a predetermined context. In certain embodiments, the common sense reasoning 208 processes are implemented to allow the CILS 118 to generate text or phrases related to a target word or phrase to perform deeper searches for the same terms. It will be appreciated that if the context of a word is better understood, then a common sense understanding of the word can then be used to assist in finding better or more accurate information. In certain embodiments, this better or more accurate understanding of the context of a word, and its related information, allows the CILS 118 to make more accurate deductions, which are in turn used to generate cognitive insights.

As likewise used herein, natural language processing (NLP) 210 broadly refers to interactions with a system, such as the CILS 118, through the use of human, or natural, languages. In various embodiments, various NLP 210 processes are implemented by the CILS 118 to achieve natural language understanding, which enables it to not only derive meaning from human or natural language input, but to also generate natural language output.

Summarization 212, as used herein, broadly refers to processing a set of information, organizing and ranking it, and then generating a corresponding summary. As an example, a news article may be processed to identify its primary topic and associated observations, which are then extracted, ranked, and then presented to the user. As another example, summarization operations may be performed on the same news article to identify individual sentences, rank them, order them, and determine which of the sentences are most impactful in describing the article and its content. As yet another example, a structured data record, such as a patient's electronic medical record (EMR), may be processed using the summarization 212 process to generate sentences and phrases that describes the content of the EMR. In various embodiments, various summarization 212 processes are implemented by the CILS 118 to generate summarizations of content streams, which are in turn used to generate cognitive insights.

As used herein, temporal/spatial reasoning 214 broadly refers to reasoning based upon qualitative abstractions of temporal and spatial aspects of common sense knowledge, derived from common sense reasoning processes described in greater detail herein. For example, it is not uncommon for a predetermined set of data to change due to an associated change in time or location. Likewise, other attributes, such as its associated metadata, may likewise change due to an associated change in time or location. As a result, these changes may affect the context of the data. To further the example, the context of asking someone what they believe they should be doing at 3:00 in the afternoon during the workday while they are in their office at work may be quite different than asking the same user the same question at 3:00 on a Sunday afternoon when they are relaxing at home in their living room. In various embodiments, various temporal/spatial reasoning 214 processes are implemented by the CILS 118 to determine the context of queries, and associated data, which are in turn used to generate cognitive insights.

As likewise used herein, entity resolution 216 broadly refers to the process of finding elements in a set of data that refer to the same entity across different data sources (e.g., structured, non-structured, streams, devices, etc.), where the target entity does not share a common identifier. In various embodiments, the entity resolution 216 process is implemented by the CILS 118 to identify significant nouns, adjectives, phrases or sentence elements that represent various predetermined entities within one or more domains. From the foregoing, it will be appreciated that the implementation of one or more of the semantic analysis 202, goal optimization 204, collaborative filtering 206, common sense reasoning 208, natural language processing 210, summarization 212, temporal/spatial reasoning 214, and entity resolution 216 processes by the CILS 118 can facilitate the generation of a semantic, cognitive model.

In various embodiments, the CILS 118 receives ambient signals 220, curated data 222, and learned knowledge, which is then processed by the CILS 118 to generate one or more cognitive graphs 226. In turn, the one or more cognitive graphs 226 are further used by the CILS 118 to generate cognitive insight streams, which are then delivered to one or more destinations 230, as described in greater detail herein. In various embodiments, the destination may include a cognitive application, likewise described in greater detail herein.

As used herein, ambient signals 220 broadly refer to input signals, or other data streams, that may contain data providing additional insight or context to the curated data 222 and learned knowledge 224 received by the CILS 118. For example, ambient signals may allow the CILS 118 to understand that a user is currently using their mobile device, at location 'x', at time 'y', doing activity 'z'. To further the example, there is a difference between the user using their mobile device while they are on an airplane versus using their mobile device after landing at an airport and walking between one terminal and another. To extend the example even further, ambient signals may add additional context, such as the user is in the middle of a three leg trip and has two hours before their next flight. Further, they may be in terminal A1, but their next flight is out of C1, it is lunchtime, and they want to know the best place to eat. Given the available time the user has, their current location, restaurants that are proximate to their predicted route, and other factors such as food preferences, the CILS 118 can perform various cognitive operations and provide a recommendation for where the user can eat.

In various embodiments, the curated data 222 may include structured, unstructured, social, public, private, streaming, device or other types of data described in greater detail herein. In certain embodiments, the learned knowledge 224 is based upon past observations and feedback from the presentation of prior cognitive insight streams and recommendations. In various embodiments, the learned knowledge 224 is provided via a feedback look that provides the learned knowledge 224 in the form of a learning stream of data.

As likewise used herein, a cognitive graph 226 refers to a representation of expert knowledge, associated with individuals and groups over a period of time, to depict relationships between people, places, and things using words, ideas, audio and images. As such, it is a machine-readable formalism for knowledge representation that provides a common framework allowing data and knowledge to be shared and reused across user, application, organization, and community boundaries.

In various embodiments, the information contained in, and referenced by, a cognitive graph 226 is derived from many sources (e.g., public, private, social, device), such as curated data 222. In certain instances of these embodiments, the cognitive graph 226 assists in the identification and organization of information associated with how people, places and things are related to one other. In various embodiments, the cognitive graph 226 enables automated cognitive agents, described in greater detail herein, to access the Web more intelligently, enumerate inferences through utilization of curated, structured data 222, and provide answers to questions by serving as a computational knowledge engine.

In certain embodiments, the cognitive graph 226 not only elicits and maps expert knowledge by deriving associations from data, it also renders higher level insights and accounts for knowledge creation through collaborative knowledge modeling. In various embodiments, the cognitive graph 226 is a machine-readable, declarative memory system that stores and learns both episodic memory (e.g., specific personal experiences associated with an individual or entity), and semantic memory, which stores factual information (e.g., geo location of an airport or restaurant).

For example, the cognitive graph 226 may know that a given airport is a place, and that there is a list of related places such as hotels, restaurants and departure gates. Furthermore, the cognitive graph 226 may know that people such as business travelers, families and college students use the airport to board flights from various carriers, eat at various restaurants, or shop at certain retail stores. The cognitive graph 226 may also have knowledge about the key attributes from various retail rating sites that travelers have used to describe the food and their experience at various venues in the airport over the past six months.

In certain embodiments, the cognitive insight stream 228 is bidirectional, and supports flows of information both to and from destinations 230. In these embodiments, the first flow is generated in response to receiving a query, and subsequently delivered to one or more destinations 230. The second flow is generated in response to detecting information about a user of one or more of the destinations 230. Such use results in the provision of information to the CILS 118. In response, the CILS 118 processes that information, in the context of what it knows about the user, and provides additional information to the user, such as a recommendation. In various embodiments, the cognitive insight stream 228 is configured to be provided in a "push" stream configuration familiar to those of skill in the art. In certain embodiments, the cognitive insight stream 228 is implemented to use natural language approaches familiar to skilled practitioners of the art to support interactions with a user. In various embodiments, the destinations 230 include a cognitive application used by such a user.

In various embodiments, the cognitive insight stream 228 may include a stream of visualized insights. As used herein, visualized insights broadly refer to cognitive insights that are presented in a visual manner, such as a map, an infographic, images, and so forth. In certain embodiments, these visualized insights may include various cognitive insights, such as "What happened?", "What do I know about it?", "What is likely to happen next?", or "What should I do about it?" In these embodiments, the cognitive insight stream is generated by various cognitive agents, which are applied to various sources, datasets, and cognitive graphs. As used herein, a cognitive agent broadly refers to a computer program that performs a task with minimum specific directions from users and learns from each interaction with data and human users.

In various embodiments, the CILS 118 delivers Cognition as a Service (CaaS). As such, it provides a cloud-based development and execution platform that allow various cognitive applications and services to function more intelligently and intuitively. In certain embodiments, cognitive applications powered by the CILS 118 are able to think and interact with users as intelligent virtual assistants. As a result, users are able to interact with such cognitive applications by asking them questions and giving them commands. In response, these cognitive applications will be able to assist the user in completing tasks and managing their work more efficiently.

In these and other embodiments, the CILS 118 can operate as an analytics platform to process big data, and dark data as well, to provide data analytics through a public, private or hybrid cloud environment. As used herein, cloud analytics broadly refers to a service model wherein data sources, data models, processing applications, computing power, analytic models, and sharing or storage of results are implemented within a cloud environment to perform one or more aspects of analytics.

In various embodiments, users submit queries and computation requests in a natural language format to the CILS 118. In response, they are provided with a ranked list of relevant answers and aggregated information with useful links and pertinent visualizations through a graphical representation. In these embodiments, the cognitive graph 226 generates semantic and temporal maps to reflect the organization of unstructured data and to facilitate meaningful learning from potentially millions of lines of text, much in the same way as arbitrary syllables strung together create meaning through the concept of language.

Figure 3:
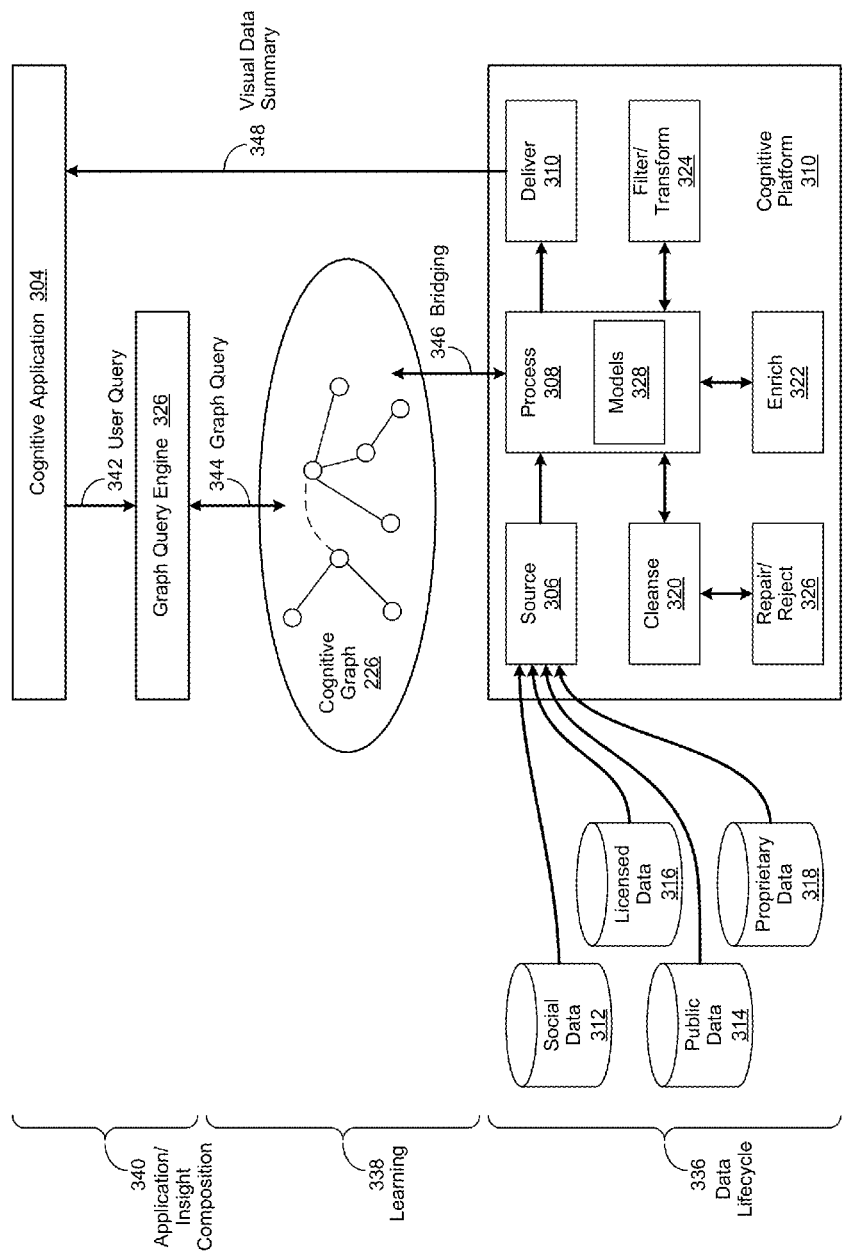
FIG. 3 is a simplified process flow diagram of a cognitive insight generation operations.

FIG. 3 is a simplified process flow diagram of a cognitive insight generation operations performed in accordance with an embodiment of the invention. In various embodiments, cognitive insight operations may be performed in various phases. In this embodiment, these phases include a data lifecycle 340 phase, a learning 338 phase, and an application/insight composition 340 phase.

In the data lifecycle 336 phase, a predetermined cognitive platform 310 instantiation sources social data 312, public data 314, licensed data 316, and proprietary data 318 from various sources. For example, the proprietary data 318 may include privately-owned data, such as an airline's frequent flier information that is only used internally to the airline. In various embodiments, the cognitive platform 310 instantiation includes a cognitive inference and learning system (CILS), such as the CILS 118 shown in FIGS. 1 and 2. In these and other embodiments, the cognitive platform 310 instantiation includes a source 306 component, a process 308 component, a deliver 310 component, a cleanse 320 component, an enrich 322 component, a filter/transform 324 component, and a repair/reject 326 component. Likewise, as shown in FIG. 3, the process 308 component includes a repository of models 328. As used herein, models 328 broadly refer to machine learning models. In certain embodiments, the models include one or more statistical models.

In various embodiments, the process 308 component is implemented to perform various cognitive insight generation and other processing operations. In these embodiments, the process 308 component is implemented to interact with the source 306 component, which in turn is implemented to perform various data sourcing operations familiar to those of skill in the art. In various embodiments, the sourcing operations are performed by one or more sourcing agents. In these embodiments, the sourcing agents are implemented to source a variety of multi-site, multi-structured source streams of data. In certain embodiments, the sourcing agents may include a batch upload agent, an API connectors agent, a real-time streams agent, a Structured Query Language (SQL)/Not Only SQL (NoSQL) databases agent, a message engines agent, and one or more custom sourcing agents. Skilled practitioners of the art will realize that other types of sourcing agents may be used in various embodiments and the foregoing is not intended to limit the spirit, scope or intent of the invention.

The resulting sourced data is then provided to the process 308 component. In turn, the process 308 component is implemented to interact with the cleanse 320 component, which in turn is implemented to perform various data cleansing operations familiar to those of skill in the art. As an example, the cleanse 320 component may perform data normalization or pruning operations, likewise known to skilled practitioners of the art. In certain embodiments, the cleanse 320 component may be implemented to interact with the repair/reject 326 component, which in turn is implemented to perform various data repair or data rejection operations known to those of skill in the art.

Once data cleansing, repair and rejection operations are completed, the process 308 component is implemented to interact with the enrich 322 component, which is implemented to perform various data enrichment operations familiar to those of skill in the art. As an example, a data stream may be sourced from Associated Press® by a sourcing agent. The enrich 322 component may then enrich the data stream by performing sentiment analysis, geotagging, and entity detection operations to generate an enriched data stream. In certain embodiments, the enrichment operations may include filtering operations familiar to skilled practitioners of the art. To further the preceding example, the Associated Press ® data stream may be filtered by a predetermined geography attribute to generate an enriched data stream.

Once data enrichment operations have been completed, the process 308 component is likewise implemented to interact with the filter/transform 324, which in turn is implemented to perform data filtering and transformation operations familiar to those of skill in the art. In various embodiments, the process 308 component is implemented to generate various models, described in greater detail herein, which are stored in the repository of models 328. The process 308 component is likewise implemented in various embodiments use the sourced data to generate one or more cognitive graphs 226, as described in greater detail herein. In various embodiments, the process 308 component is implemented to gain an understanding of the data sourced from the sources of social data 312, public data 314, licensed data 316, and proprietary data 318, which assist in the automated generation of the cognitive graph 226.

The process 308 component is likewise implemented in various embodiments to perform bridging 346 operations. In these and other embodiments, the bridging 346 operations may be performed to provide domain-specific responses when bridging a translated query to a cognitive graph. For example, the same query bridged to a target cognitive graph 226 may result in different answers for different domains, dependent upon domain-specific bridging operations performed to access the cognitive graph 226.

In certain embodiments, the bridging 346 operations are performed by bridging agents. In these embodiments, the bridging agent interprets a translated query generated by the user query 342 within a predetermined user context, and then maps it to predetermined nodes and links within a target cognitive graph 226. In various embodiments, the cognitive graph 226 is accessed by the process 308 component during the learning 336 phase of the cognitive insight generation operations.

In various embodiments, a cognitive application 304 is implemented to receive user input, such as a user query 342, which is then submitted during the application/insight composition 840 phase to a graph query engine 326. In turn, the graph query engine 326 processes the user query 342 to generate a graph query 344. The graph query 344 is then used to query the cognitive graph 226, which results in the generation of one or more cognitive insights. In various embodiments, the process 308 component is implemented to provide these cognitive insights to the deliver 310, which in turn is implemented to deliver the cognitive insights in the form of a visual data summary 348 to the cognitive application 304. In various embodiments, learning operations are iteratively performed during the learning 338 phase to provide more accurate and useful cognitive insights.

Figure 4:
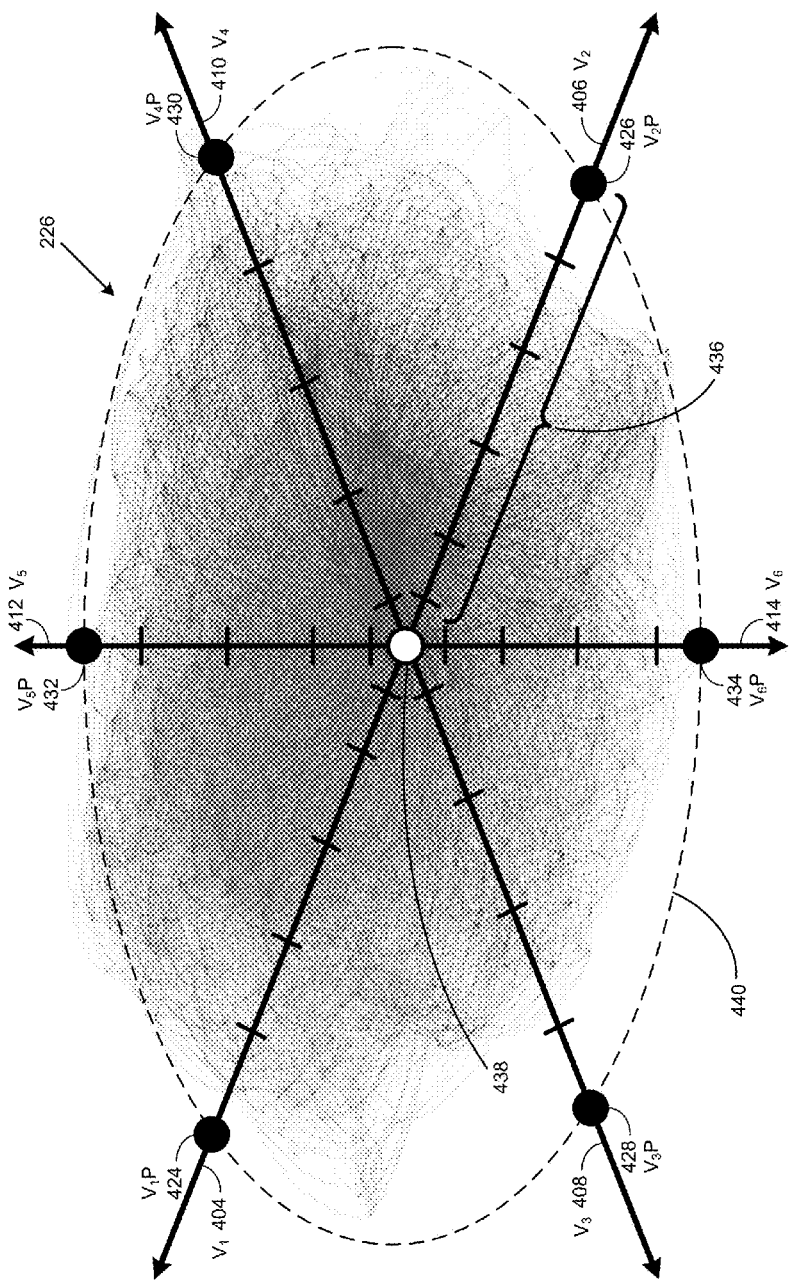
FIG. 4 shows a cognitive cloud defined by a plurality of cognitive cloud (CG) vectors.

FIG. 4 shows a cognitive cloud defined by a plurality of cognitive graph (CG) vectors implemented in accordance with an embodiment of the invention. In this embodiment, the cumulative data domain represented by a cognitive graph 226 is defined by a plurality of CG vectors $V_1$ 404, $V_2$ 406, $V_3$ 408, $V_4$ 410, $V_5$ 412 and $V_6$ 414, each of which extends from a CG nexus 438. In various embodiments, each of the CG vectors $V_1$ 404, $V_2$ 406, $V_3$ 408, $V_4$ 410, $V_5$ 412 and $V_6$ 414 is associated with a predetermined set of data within the cognitive graph 226. In these and other embodiments, the cognitive graph 226 may be defined by additional CG vectors than those shown in FIG. 4. In certain embodiments, the cognitive graph 226 may be defined by fewer CG vectors than those shown in FIG. 4.

As shown in FIG. 4, each of the CG vectors $V_1$ 404, $V_2$ 406, $V_3$ 408, $V_4$ 410, $V_5$ 412 and $V_6$ 414 includes a plurality of CG vector indices 436 corresponding to predetermined attributes associated with the data domain represented by the cognitive graph 226. In various embodiments, the magnitude of the CG vector indices 436 is substantially similar. In certain embodiments, the magnitude of the CG vector indices 436 is different. In various embodiments, CG vector parameters $V_1P$ 424, $V_2P$ 426, $V_3P$ 428, $V_4P$ 430, $V_5P$ 432 and $V_6P$ 434 are selected, which correspond to their respective CG vector indices 436. In these embodiments, the selected CG vector parameters $V_1P$ 424, $V_2P$ 426, $V_3P$ 428, $V_4P$ 430, $V_5P$ 432 and $V_6P$ 434 likewise correspond to user input values, which are used as described in greater detail herein to generate a cognitive insight.

In various embodiments, the selected CG vector parameters $V_1P$ 424, $V_2P$ 426, $V_3P$ 428, $V_4P$ 430, $V_5P$ 432 and $V_6P$ 434 define a portion 440 of the cognitive graph 226 used to generate a cognitive insight. As an example, as shown in FIG. 4, the selected CG vector parameters $V_1P$ 424, $V_2P$ 426, $V_3P$ 428, $V_4P$ 430, $V_5P$ 432 and $V_6P$ 434 are at the depicted extremities of their respective CG vectors $V_1$ 404, $V_2$ 406, $V_3$ 408, $V_4$ 410, $V_5$ 412 and $V_6$ 414. As such, a substantive portion 440 of the cognitive graph 226 is used to generate the cognitive insight.

Figure 5:
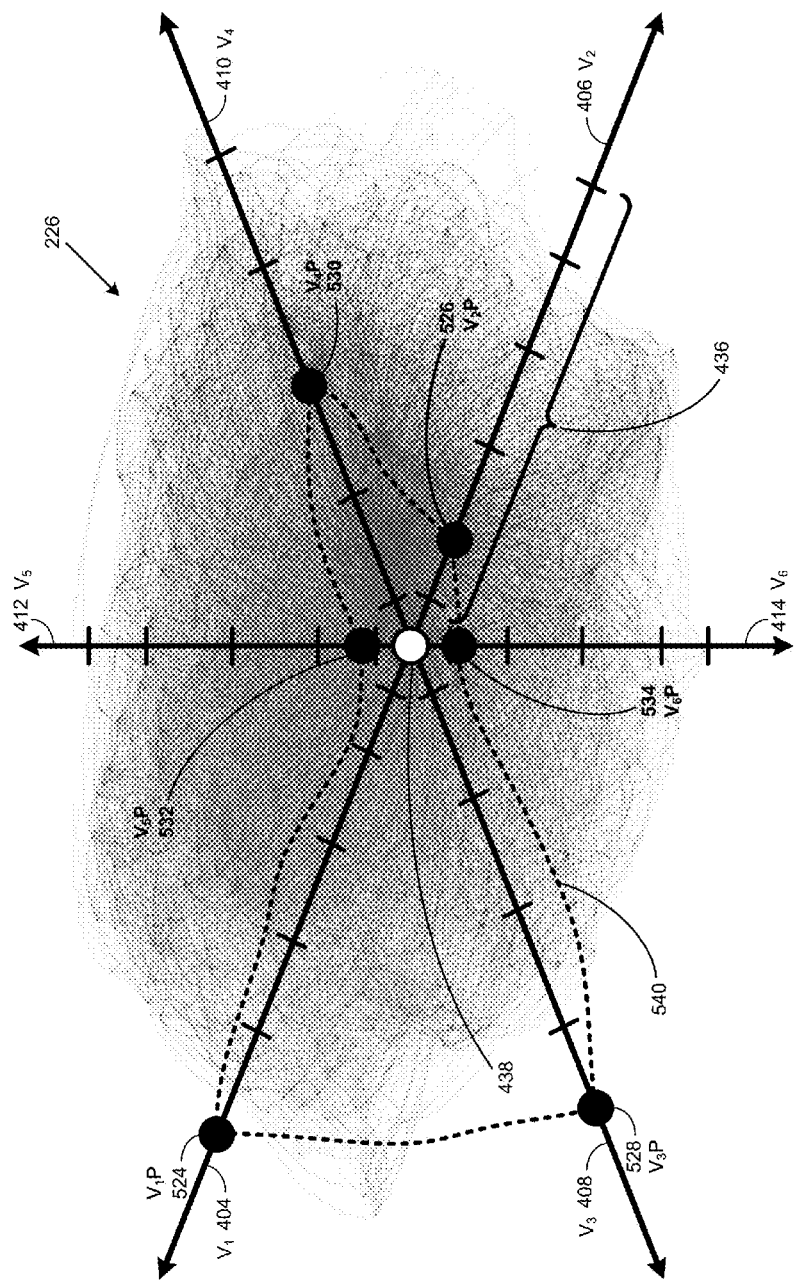
FIG. 5 shows a first portion of a cognitive cloud defined by a first set of CG vector parameters.

FIG. 5 shows a first portion of a cognitive cloud defined by a first set of cognitive graph (CG) vector parameters implemented in accordance with an embodiment of the invention. In this embodiment, a first set of CG vector parameters $V_1P$ 524, $V_2P$ 526, $V_3P$ 528, $V_4P$ 530, $V_5P$ 532 and $V_6P$ 534, corresponding to a first set of user input values, are used to define a first portion 540 of a cognitive graph 226 used to generate a first cognitive insight.

Figure 6:
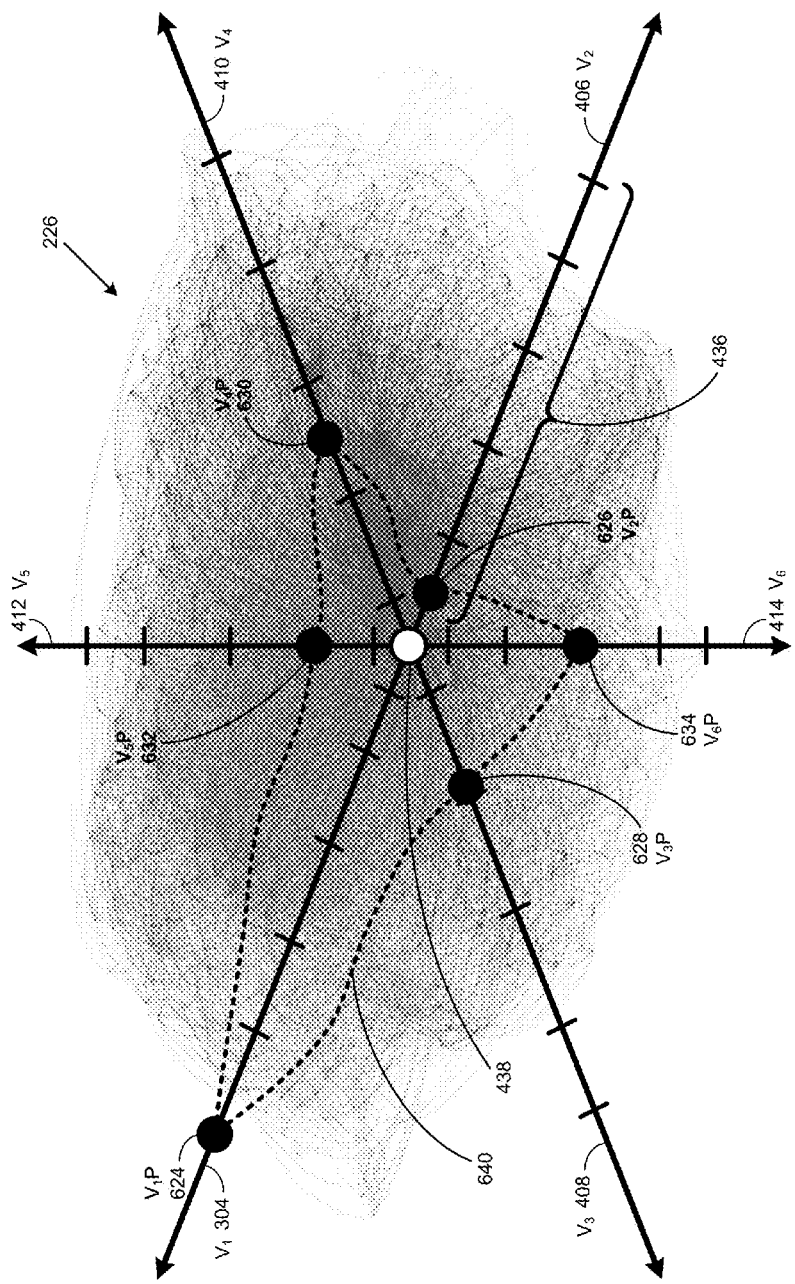
FIG. 6 shows a second portion of a cognitive cloud defined by a second set of CG vector parameters.

FIG. 6 shows a second portion of a cognitive cloud defined by a second set of cognitive graph (CG) vector parameters implemented in accordance with an embodiment of the invention. In this embodiment, a second set of CG vector parameters $V_1P$ 624, $V_2P$ 626, $V_3P$ 628, $V_4P$ 630, $V_5P$ 632 and $V_6P$ 634, corresponding to a second set of user input values, are used to define a second portion 640 of a cognitive graph 226 used to generate a second cognitive insight. In various embodiments, the second set of user input values are based upon the first set of user input values described in the descriptive text associated with FIG. 5. In these embodiments, the first set of CG vector parameters $V_1P$ 524, $V_2P$ 526, $V_3P$ 528, $V_4P$ 530, $V_5P$ 532 and $V_6P$ 534 are modified to generate the second set of CG vector parameters $V_1P$ 624, $V_2P$ 626, $V_3P$ 628, $V_4P$ 630, $V_5P$ 632 and $V_6P$ 634. In various embodiments, additional such modifications are iteratively performed on the second set of CG vector parameters $V_1P$ 624, $V_2P$ 626, $V_3P$ 628, $V_4P$ 630, $V_5P$ 632 and $V_6P$ 634 to define additional portions 640 of the cognitive graph 226, which in turn are used to generate additional cognitive insights.

Although the present invention has been described in detail, it should be understood that various changes, substitutions and alterations can be made hereto without departing from the spirit and scope of the invention as defined by the appended claims.

What is claimed is:

1. A method for refining cognitive insights using cognitive graph vectors comprising:
   storing data from a plurality of data sources within a cognitive graph, the plurality of data sources comprising at least one of a social data source stored in a social data repository, public data source stored in a public data repository, licensed data source stored in a licensed data repository and proprietary data source stored in a proprietary data repository;
   associating a first set of the data within the cognitive graph with a first cognitive graph vector of a plurality of cognitive graph vectors;
   associating a second set of the data within the cognitive graph with a second cognitive graph vector of the plurality of cognitive graph vectors;
   processing the data from the plurality of data sources to provide cognitive insights; and
   refining the cognitive insights based upon a limitation relating to one of the plurality of cognitive graph vectors; and,
   providing the cognitive insights to a destination via a cognitive insight stream, the cognitive insight stream comprising a stream of visualized insights, the destination comprising a cognitive application, the cognitive application enabling a user to interact with the cognitive insights.

2. The method of claim 1, wherein:
   the first cognitive graph vector comprises a plurality of first cognitive graph vector indices extending along the first cognitive graph vector away from a cognitive graph nexus;
   the second cognitive graph vector comprises a plurality of second cognitive graph vector indices extending along the second cognitive graph vector away from the cognitive graph vector;
   the limitation comprises limiting the first set of data to data within a first certain index of the plurality of first cognitive graph vector indices; and
   the refining comprising limiting the second set of data to data within a second certain index of the second cognitive graph vector indices.

3. The method of claim 1, further comprising:
   associating a third set of data within the cognitive graph with a third cognitive graph vector of the plurality of cognitive graph vectors; and, wherein
   the refining the cognitive insights based upon the limitation relating to one of the plurality of cognitive graph vectors further comprises identifying a limitation on one of the first, second and third cognitive graph vectors and refining another of the first, second and third cognitive graph vectors based upon the limitation of one of the first, second and third cognitive graph vectors.

4. The method of claim 3, wherein:
   the first cognitive graph vector comprises a plurality of first cognitive graph vector indices extending along the first cognitive graph vector away from a cognitive graph nexus;
   the second cognitive graph vector comprises a plurality of second cognitive graph vector indices extending along the second cognitive graph vector away from the cognitive graph vector;
   the third cognitive graph vector comprises a plurality of third cognitive graph vector indices extending along the third cognitive graph vector away from the cognitive graph vector;
   the limitation comprises limiting the first set of data to data within a first certain index of the plurality of first cognitive graph vector indices;
   the refining comprising limiting the second set of data to data within a second certain index of the second cognitive graph vector indices and data within a third; and
   the refining further comprising limiting the third set of data to data within a third certain index of the third cognitive graph vector indices.

5. The method of claim 4, wherein:
   at least some of the first cognitive graph vector indices, second cognitive graph vector indices and third vector graph indices are different magnitudes.

6. The method of claim 4, wherein:
   at least some of the first cognitive graph vector indices, second cognitive graph vector indices and third vector graph indices are substantially similar magnitudes.

* * * * *

UNITED STATES PATENT AND TRADEMARK OFFICE
CERTIFICATE OF CORRECTION

PATENT NO. : 9,514,418 B2  
APPLICATION NO. : 14/629740  
DATED : December 6, 2016  
INVENTOR(S) : Matthew Sanchez Page 1 of 1

It is certified that error appears in the above-identified patent and that said Letters Patent is hereby corrected as shown below:

In the Claims

- Claim 2, Column 13, Line 44, should read "nitive graph nexus"

- Claim 4, Column 14, Line 24, should read "nitive graph nexus"

- Claim 4, Column 14, Line 28, should read "graph nexus"

Signed and Sealed this  
Seventh Day of February, 2017

Michelle K. Lee  
*Director of the United States Patent and Trademark Office*